Dec. 20, 1960 R. A. CRESSWELL 2,965,746
ELECTRIC ARC WELDING
Filed Aug. 22, 1958

Robert Arthur Cresswell
By Aaron R. Townshend
Attorney

United States Patent Office 2,965,746
Patented Dec. 20, 1960

2,965,746

ELECTRIC ARC WELDING

Robert Arthur Cresswell, Tadworth, England, assignor to The British Oxygen Company Limited, a British company Filed Aug. 22, 1958, Ser. No. 756,724

Claims priority, application Great Britain Aug. 22, 1957

4 Claims. (Cl. 219—137)

This invention relates to electric arc welding and in particular to automatic and semi-automatic electric arc welding at high current intensities.

In the welding of steels particularly of heavy section, it is advantageous both technically and economically to achieve high metal deposition rates together with good metallurgical properties. The method of the present invention enables the deposition of more than 100 lbs. of good quality weld metal per hour in suitable circumstances.

According to the present invention, in a method of electric arc welding, an electric arc is established between the tip of a continuous electrode and a workpiece, a high welding current is conducted to the electrode, as it is fed to the arc, by contact means spaced from the tip of the electrode by a distance of not less than two inches, the electrode passing from the contact means to the arc is guided by means either formed of electrically insulated material or insulated from the contact means, and a stream of shielding gas is directed around the guide means, the tip of the electrode and over the welding zone. The high welding current and the spacing of the contact means from the tip of the electrode arc preferably such that the electrode is raised almost to its melting point by electrical resistance heating.

In conventional electric arc welding with a consumable electrode the distance between the point at which welding current is conducted to the electrode and the tip of the electrode is of the order of one inch to one and one half inches. In the method of the present invention, however, this distance, which hereafter is referred to as the electrode extension, is made not less than two inches and may be as much as six inches, or more.

The electrode may conveniently be a tubular electrode in the form of a bare metallic casing enclosing a core including deoxidising material, and the electric arc, the electrode tip and welding zone may be shielded by a stream of a gas such as carbon dioxide.

Apparatus for performing the method of the present invention may include contact means for conducting electric current to a continuous welding electrode as the electrode is fed to an electric arc established between the tip of the electrode and a workpiece, guide means insulated from the contact means and arranged to guide the electrode passing from the contact means, and means for directing a stream of shielding gas around the guide means, the tip of the welding electrode, and the electric arc and over the welding zone.

Figure 1:
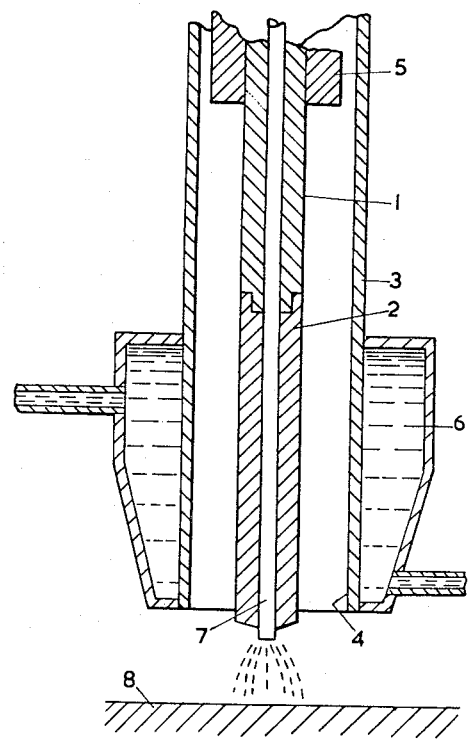
Figure 2:
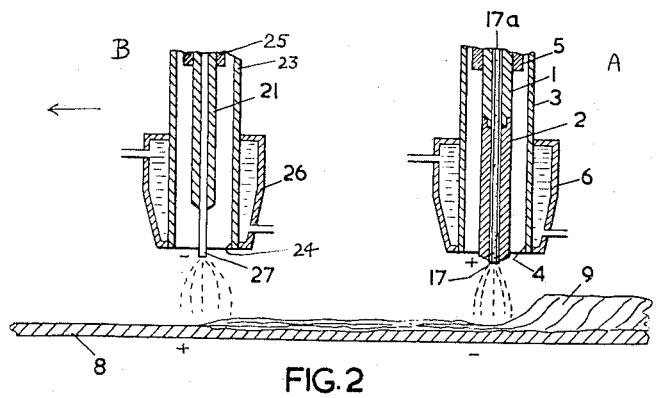

Welding apparatus for carrying out the method of the present invention will now be described by way of example with reference to the accompanying drawing which shows in Figure 1 a diagrammatic sectional view of a part of the apparatus including a gas directing nozzle and a tubular metal contact member for the electrode; and in which Figure 2 is a similar drawing but to a smaller scale including a second welding head which provides a preheating arc.

Referring to Figure 1 of the drawing, the apparatus includes a tubular metal contact member 1 on the outlet end of which is coaxially mounted a tubular guide 2 of refractory material. The guide 2 must be able to withstand relatively high temperatures and may be formed of refractory materials such as, bonded zirconia, sillimanite, mullite, silicon nitride or heat resisting alloys. The length of the guide will depend on the extension required but will generally not be less than two inches. The contact member 1 and tubular guide 2 are disposed within a tube 3 for feeding shielding gas such as carbon dioxide to the welding zone and the contact member 1 and a nozzle 4 at the end of the gas supply tube 3 are each provided with encircling passages 5 and 6 respectively to allow for water cooling.

An electrode 7, which may be of the tubular type having a metal casing enclosing a compacted core of powdered fluxing materials, is fed through the contact member 1 and tubular guide 2 during the welding operation by conventional feed rolls, not shown, which are driven by an electric motor at a substantially contant speed. Welding current is fed to the electrode as it passes through the contact member 1, an electric arc being established between the tip of the electrode 7 and a workpiece 8.

By appropriate selection of the welding factors, the process may be operated so that a molten stream of metal may be delivered at high speed to the workpiece. To prevent blockages through chilling of molten metal in the tubular guide 2 it may be desirable to commence and finish welding at a value of welding current which is lower than that obtained during normal welding according to the invention. At the commencement of welding, this lower value of welding current may be used until the tubular guide 2 has warmed up and may then be increased continuously or in steps to the higher value. At the end of the welding process the welding current may be reduced continuously or in steps so that solid electrode is passing through the tubular guide 2 when the flow of welding current is interrupted. The welding current will generally be such as to produce a current density in the electrode of at least 50,000 amperes per square inch. Means for increasing or decreasing the welding current continuously or in steps may include insertable or withdrawable resistors in the case of direct welding current and transformer tap-changes in the case of alternating welding current. Where necessary auxiliary heating means such as an electrical resistance heating coil may be arranged to heat the tubular guide 2 in particular before welding is commenced.

Although sufficient molten metal may be supplied to fill the weld preparation there may be insufficient heat available using a single electrode to allow full fusion into the workpiece. In such cases a non-consumable electrode preheating arc may be used ahead of the consumable electrode to maintain a high welding speed. Alternatively more than one consumable electrode may be used, the leading electrode having welding current conducted to it at the conventional distance from the electrode tip of less than one and one half inches and the following electrode or electrodes having this distance, i.e. the extension, increased above two inches to make use of the resistance heating effect and deposit weld metal at an increased rate.

The apparatus shown in Fig. 2 comprises a welding head A as shown in Fig. 1 where similar parts have the same reference numerals. In Fig. 2 however, the electrode 7 has been replaced by a tubular electrode 17 having a fluxing and deoxidising core 17a. Preceding the welding head A in its movement relative to the workpiece 8 is shown a preheating head B which includes a tubular metal contact member 21 disposed within a tube 23 for feeding shielding gas such as carbon dioxide to the preheating zone, and the contact member 21 and a nozzle 24 at the end of the gas supply tube 23 are each provided with encircling passages 25 and 26 respectively to allow for water cooling.

A consumable electrode 27 is fed through the contact member 21 during the welding operation by conventional feed rolls, not shown, which are driven by an electric motor at a substantially constant speed. Electric current is fed to the electrode 27 as it passes through the contact member 21, an electric arc being established between the tip of the electrode 27 and the workpiece 8. This electrode 27 is operated with a conventional electrode extension, the distance between the tip of the electrode and the contact member being less than 1½ inches. The preheating head B and the welding head A are moved along the weld seam in the direction of the arrow, and a layer of slag 9 produced from the core 17a of the electrode 17 is shown covering the deposited weld metal.

The smaller amount of heat transmitted to the workpiece when using increased extensions makes the present invention particularly suitable for surfacing and cladding operations where dilution of the surface coating by the metal of the workpiece is not desired. Thus dilution levels of 10 to 15% can be achieved using the present invention where, with conventional single electrode practice, dilution levels below 20% could not be obtained. The invention is also particularly applicable to positional welding, on vertical or overhead surfaces, where the quicker freezing of the weld pool enables higher deposition rates to be obtained.

Where two or more electrodes are used they may be spaced at such a distance and may be so directed that the mechanical force on the electrode tips due to the magnetic fields set up by the welding current flowing through the electrodes and the welding arcs assists in guiding the molten or nearly molten weld metal towards the workpiece. It has been found that when a preheating arc and a welding arc are separately supplied with electric current, the polarity of each electrode with respect to the workpiece can be so arranged that a narrow weld pool is produced. Thus, for example, two electrodes having D.C. welding current flowing through them in the same sense may be arranged parallel to one another so that the mechanical force due to the welding current directs the molten or nearly molten weld metal into a relatively narrow weld pool. Similarly, two electrodes having opposite polarities as shown in Fig. 2 where the preheat electrode is negative and the FRT electrode is positive may be used, and the weld pools fed by these electrodes have been found to be mutually attracted, producing a resultant weld pool which is relatively narrow along the length of the weld seam.

To illustrate the high deposition rate obtainable by the use of the invention a table will now be given showing the rate of deposition of weld metal in pounds per minute when passing different values of welding current through a specific tubular electrode with different extensions of electrode.

| Current, amps. | Deposition Rates, lbs./min. | | |
| --- | --- | --- | --- |
| | Normal Extensions, 1–1½ in. | Extensions, 2 in. | Extensions, 6 in. |
| 450 | 0.21 | 0.304 | 0.854 |
| 550 | 0.37 | 0.421 | 1.283 |
| 650 | 0.5 | 0.557 | 1.810 |
| 750 | 0.62 | 0.716 | 2.437 |
| 800 | 0.70 | 0.800 | 2.780 |

These figures apply to a tubular electrode of 7/64 inch external diameter and 24 S.W.G. wall thickness having a flux core of the high rutile type including deoxidant material in the form of ferro-manganese and ferro-silicon. One flux core of this type has the following composition:

Parts by weight
Titanium dioxide _____ 31
Calcium fluoride _____ 16
Ferro manganese _____ 9
Ferro-silicon _____ 2
Iron powder _____ 42

To give an indication of the speed at which welding may be carried out, the experimental conditions of four examples of the use of this type of electrode at two of the current values specified above will now be given.

*Example 1*

Half inch thick mild steel plate was welded at 4 to 4½ inches per minute, the extension of the electrode being 2 inches. D.C. welding current at 450 amperes was supplied and the potential applied across the extension of the electrode and the electric arc was 32/35 volts. Shielding gas consisting of carbon dioxide was supplied to the welding zone at 45 cubic feet per hour.

*Example 2*

With the same conditions as in Example 1 but with a 6 inch electrode extension and potential of 35/37 volts, a welding speed of 12–13 inches per minute was obtained. A refractory guide tube was used to direct the electrode tip towards the plate being welded.

*Example 3*

One inch thick mild steel plate was welded at 2½ to 3 inches per minute, the extension of the electrode being 2 inches. D.C. welding current at 750 amperes was supplied and the potential applied across the extension of the electrode and the electric arc was 35 volts. The tubular electrode, which was shielded by a stream of carbon dioxide, was preceded by a tungsten electrode shielded by a stream of inert gas.

*Example 4*

With the same conditions as in Example 3 but with an electrode extension of 6 inches and a potential of 38 volts, a welding speed of 8½ to 9 inches per minute was obtained.

The method of the present invention may also be practised with uncoated wire electrodes and with flux coated electrodes of the kind adapted for use in continuous arc welding.

I claim:

1. A method of electric arc welding comprising: establishing an electric arc between a workpiece and the tip of a consumable electrode; conducting unidirectional welding current to the electrode as it is fed to the arc by contact means spaced more than two inches from the tip of the electrode; guiding the electrode passing from the contact means to the arc by heat-resistant guide means insulated from the contact means; directing a stream of shielding gas around the guide means, the tip of the electrode, the electric arc, and over the weld zone; establishing a gas shielded preheating arc between a second consumable electrode and the workpiece; and supplying a second unidirectional welding current to the second electrode at a distance less than 1½ inches from its tip such that the polarity of the electrode tips is opposite, whereby the mechanical force due to these opposite polarities directs the molten metal to form a relatively narrow weld seam.

2. A method of electric arc welding as claimed in claim 1 wherein the first-mentioned consumable electrode is a tubular electrode having a fluxing and deoxidising core.

3. A method of electric arc welding as claimed in claim 2 wherein a unidirectional welding current of from 450 to 800 amperes is supplied to the tubular electrode at an arc voltage of from 32 to 38 volts.

4. A method of electric arc welding as claimed in claim 2 wherein the shielding gas directed around the guide means, the tip of the tubular electrode, the electric arc, and over the weld zone is carbon dioxide.

References Cited in the file of this patent

UNITED STATES PATENTS

| | | |
|---|---|---|
| 1,495,272 | Stresan | May 27, 1924 |
| 2,305,206 | Strobel | Dec. 15, 1942 |
| 2,475,835 | Hehenkamp | July 12, 1949 |
| 2,655,586 | Schreiner et al. | Oct. 13, 1953 |
| 2,658,162 | Tichenor et al. | Nov. 3, 1953 |
| 2,669,640 | Outcalt et al. | Feb. 6, 1954 |
| 2,721,249 | Landis et al. | Oct. 18, 1955 |
| 2,736,787 | Welch | Feb. 28, 1956 |
| 2,756,311 | Persson et al. | July 24, 1956 |
| 2,876,330 | Reinhardt | Mar. 3, 1959 |

FOREIGN PATENTS

| | | |
|---|---|---|
| 762,170 | Great Britain | Nov. 21, 1956 |
| 787,910 | Great Britain | Dec. 18, 1957 |

OTHER REFERENCES

"Welding Engineer," May 1957, pages 41–42.